United States Patent
Rochard

(10) Patent No.: US 8,154,302 B2
(45) Date of Patent: Apr. 10, 2012

(54) DEVICE FOR DETECTING THE FAILURE OF AN ELECTRICAL POWER SUPPLY FOR A LOGIC UNIT

(75) Inventor: Pascal Rochard, Villeneuve Tolosane (FR)

(73) Assignee: Continental Automotive France, Toulouse (FR)

( * ) Notice: Subject to any disclaimer, the term of this patent is extended or adjusted under 35 U.S.C. 154(b) by 202 days.

(21) Appl. No.: 12/523,410

(22) PCT Filed: Dec. 3, 2007

(86) PCT No.: PCT/EP2007/010470
§ 371 (c)(1),
(2), (4) Date: Jul. 16, 2009

(87) PCT Pub. No.: WO2008/089811
PCT Pub. Date: Jul. 31, 2008

(65) Prior Publication Data
US 2010/0060293 A1 Mar. 11, 2010

(30) Foreign Application Priority Data

Jan. 24, 2007 (FR) .................................... 07 00476

(51) Int. Cl.
*G01R 31/08* (2006.01)
(52) U.S. Cl. ........ 324/512; 324/418; 324/537; 324/511; 307/10.1
(58) Field of Classification Search .................. 324/418, 324/511, 512, 537; 307/10.1; 713/321
See application file for complete search history.

(56) References Cited

U.S. PATENT DOCUMENTS 5,621,250 A * 4/1997 Kim .............................. 307/10.1
6,590,758 B1 * 7/2003 Friede et al. ................... 361/170

FOREIGN PATENT DOCUMENTS

DE 4403309 8/1995

OTHER PUBLICATIONS

International search report dated Mar. 7, 2008 in corresponding PCT/EP2007/010470.

* cited by examiner

*Primary Examiner* — Huy Q Phan
*Assistant Examiner* — Son Le
(74) *Attorney, Agent, or Firm* — Young & Thompson

(57) ABSTRACT

An electrical power supply device for a logic unit (1), includes a control member (7) that can transmit a control voltage (6), a power relay (3), transmitting a power voltage (2) when it is controlled, an electronic stage (8) controlling the power relay (3) when the electronic stage (8) receives a control voltage (6, 22) from the control member (7) or from the logic unit (1), a voltage regulator (12) transmitting a power supply voltage (20) to the logic unit (1) when it receives the power voltage (2) from the power relay (3) and a control voltage (6, 23) and a wake-up element (17) capable of transmitting an additional control voltage (24) to the voltage regulator (12) when the power relay (3) transmits the power voltage (2). The power supply is applicable to motor vehicle computers and to the detection of failure of the relay stage (3, 8).

4 Claims, 4 Drawing Sheets

DEVICE FOR DETECTING THE FAILURE OF AN ELECTRICAL POWER SUPPLY FOR A LOGIC UNIT

The present invention relates to an electrical power supply device for a logic unit. In particular, the present invention improves on a self-maintained power supply device for a motor vehicle computer by allowing a failure of the relay stage to be detected.

Figure 1:
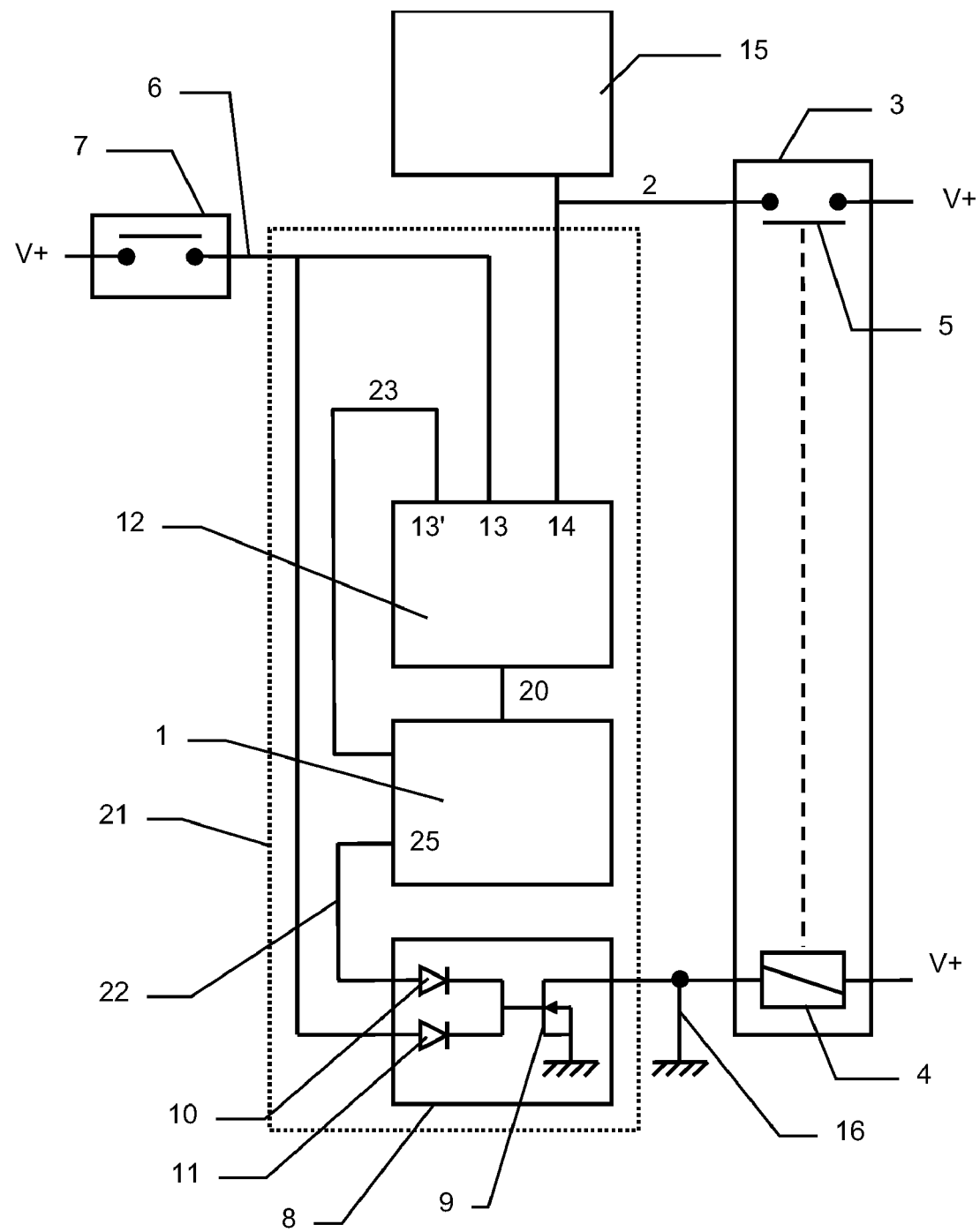

FIG. 1 illustrates a device according to the prior art. The device is intended for the management of the electrical power supply of a logic unit 1, such as a microcontroller or a microprocessor. This logic unit 1 is powered by a voltage regulator 12 by means of a power supply voltage 20, as long as the voltage regulator 12 simultaneously receives a power voltage 2 obtained from a power relay 3 (via its power input 14) and a control voltage 6 (via its control input 13), or else as long as the voltage regulator 12 simultaneously receives a power voltage 2 obtained from a power relay (via its power input 14) and a control voltage 23 (via its control input 13').

It must be stressed that the voltage regulator 12 has a power input 14 and at least two control inputs 13, 13'. The control inputs (or "enable inputs") are intended to enable the voltage regulator 12 and are all equivalent (the voltage regulator 12 having internally the equivalent of an "OR" logic gate connected to all the available control inputs).

The power relay 3, comprising a contactor 5 and a coil 4, transmits said power voltage 2 when it is controlled, that is, when its coil 4 is excited. The excitation of the coil 4 of the power relay 3 is controlled by an electronic stage 8. This electronic stage 8 performs a logic "OR" between its two inputs and controls the power relay 3 when at least one of its inputs receives a control voltage 6 or 22. This can be implemented as in the example illustrated by two diodes 10, 11 and a transistor 9. The presence of a control voltage on one of the two inputs of the electronic stage 8 activates the base of the transistor 9 which, having become conducting, links one of the terminals of the coil 4 to the ground. Since the other terminal of the coil 4 is linked to a voltage source, the voltage V+ in the example of the figure (representing the battery voltage in a motor vehicle application), the coil 4 is excited and the relay is controlled.

The first input of the electronic stage 8 is connected to an output 25 of the logic unit 1. The second input is connected to a control member 7. The control voltage received by the electronic stage 8 thus originates either from the logic unit 1 or from the control member 7.

The way this device operates normally on start-up is as follows.

An operation of the control member 7 (which can be the ignition key in a motor vehicle application) closes a circuit and transmits a control voltage 6, the voltage V+ in the example of the figure (representing the battery voltage in a motor vehicle application), simultaneously to the voltage regulator 12, via its input 13, and to the electronic stage 8, via one of its inputs. The duly activated electronic stage 8 controls the power relay 3. The controlled power relay 3 transmits the power voltage 2, the voltage V+ in the example of the figure, to the voltage regulator 12 (via its input 14) and also to other equipment represented here by the load 15. The voltage regulator 12 then simultaneously receives the control voltage 6, obtained from the control member 7, and the power voltage 2, obtained from the power relay 3. The voltage regulator 12 then powers the logic unit 1 by transmitting to it a power supply voltage 20, that can be obtained from the power voltage 2 for example.

The different power supply voltages of the device can be differentiated. Thus, the voltages respectively applied to the control member 7, to the coil 4 and to the contactor 5 can be different. The figure illustrates a particular case of a motor vehicle application in which all the primary voltages are identical to V+. Similarly, the power supply voltage 20 of the logic unit 1 can be transformed by the voltage regulator 12 from the power voltage 2 or be identical to it. Given an adaptation of the electronic stage 8, the control voltage 22 obtained from the logic unit 1 and the control voltage 6 obtained from the control member 7 can even be different.

The logic unit 1, when it is powered, can operate. As soon as possible after its start-up, it transmits, on one of its outputs, the control voltage 22 to the electronic stage 8, in order to control the power relay 3 and, in parallel on one of its outputs, a control voltage 23 to the input 13' of the voltage regulator 12.

The logic unit 1 then uses the power supply device to self-maintain its power supply. This makes it possible, still according to normal operation, to proceed with shutdown according to the following procedure. The control member 7 opens the circuit and stops transmitting the control voltage 6 to the voltage regulator 12 and to the electronic stage 8. The electronic stage 8 still however receives the control voltage 22 originating from the logic unit 1, which ensures the control of the power relay 3 and the transmission to the voltage regulator 12 of the power voltage 2 on its input 14. Furthermore, the voltage regulator 12 still receives the control voltage 23 obtained from the logic unit 1. Consequently, the voltage regulator 12, still receiving both the power voltage 2 and the control voltage 23, continues to power the logic unit 1. Said logic unit 1 can therefore continue its operation for as long as necessary, as long as it decides to control its output or outputs in order to maintain the control voltage 22 to the electronic stage 8 and its output 23 to the input 13' of the voltage regulator 12. When informed by one of its inputs (not represented) of the opening of the circuit of the control member 7, it can thus perform termination tasks, before deciding to shut down or "to get in a sleep made" by stopping the control voltage 23 to the input 13' of the voltage regulator 12, which causes the logic unit 1 no longer to be powered, so the logic unit 1 no longer delivers control voltage 22 to the electronic stage 8. This stops the control of the power relay 3 and consequently the transmission of the power voltage 2 to the voltage regulator 12.

An alternative to this shutdown mode consists, for the logic unit 1, in stopping the control voltage 22 to the electronic stage 8, but the first alternative described is preferable to it in terms of operating safety.

Such a power supply device is representative of the devices that currently exist. The need for a voltage regulator 12, and the use of control voltages 6 and 23 as described to control said voltage regulator 12, is systematic in order to avoid a direct connection of the consuming equipment 1, 15 to the battery voltage, which represents a source of discharge of said battery.

However, such a power supply device can develop a fault through a failure 16 of the relay stage 3, 8. A failure 16 is, for example, caused by a short circuit 16 to the ground in a circuit portion between the electronic stage 8 and the coil 4 of the power relay 3. Such a short circuit 16 (a blocking in the conducting position of the transistor 9 of the electronic stage 8, or any equivalent failure) can originate both inside the computer 21, and outside, and causes the power relay 3 to remain controlled and the power voltage 2 to continue inopportunely to be transmitted in particular to the additional equipment 15. This leads to a damaging consumption that contributes to battery discharge. Such a failure 16 cannot be detected by the logic unit 1, since, when the logic unit 1 is operating and is capable of performing measurements for diagnostic purposes, the power relay 3 is normally controlled. When it is shut down, nor can the logic unit 1, by definition, detect the failure 16.

The invention remedies this problem of diagnosing such a failure by improving the electrical power supply device for a logic unit of the prior art comprising a control member that can transmit a control voltage, a power relay, transmitting a power voltage when it is controlled, an electronic stage controlling the power relay when the electronic stage receives a control voltage from the control member or from the logic unit, a voltage regulator transmitting the power voltage to the logic unit when it receives the power voltage from the power relay and a control voltage, by adding to it a wake-up means capable of transmitting an additional control voltage to the voltage regulator when the power relay transmits the power voltage.

According to a first embodiment of the invention, the wake-up means is such that it transmits the control voltage to the voltage regulator when the wake-up means receives the control voltage from the control member or when the wake-up means receives the power voltage from the power relay.

According to a second embodiment of the invention, the voltage regulator comprises a first input for the control voltage obtained from the control member, a second input for the control voltage obtained from the logic unit, and a third control input, equivalent to the preceding control inputs, and wherein the wake-up means is such that it transmits the control voltage to the third input of the voltage regulator when the wake-up means receives the power voltage from the power relay.

According to another feature of the invention, the wake-up means comprises a direct connection between the power voltage obtained from the power relay and the third input.

The invention also relates to a method, for a power supply device according to the invention, of detecting a failure such that the power relay transmits the power voltage independently of the reception of the control voltage, comprising the following steps: on start-up or following an inability to complete a putting-to-sleep of the logic unit, measurement by the logic unit of the state of the control voltage obtained from the control member, identification of a failure in the event of absence of control voltage.

Figure 2:
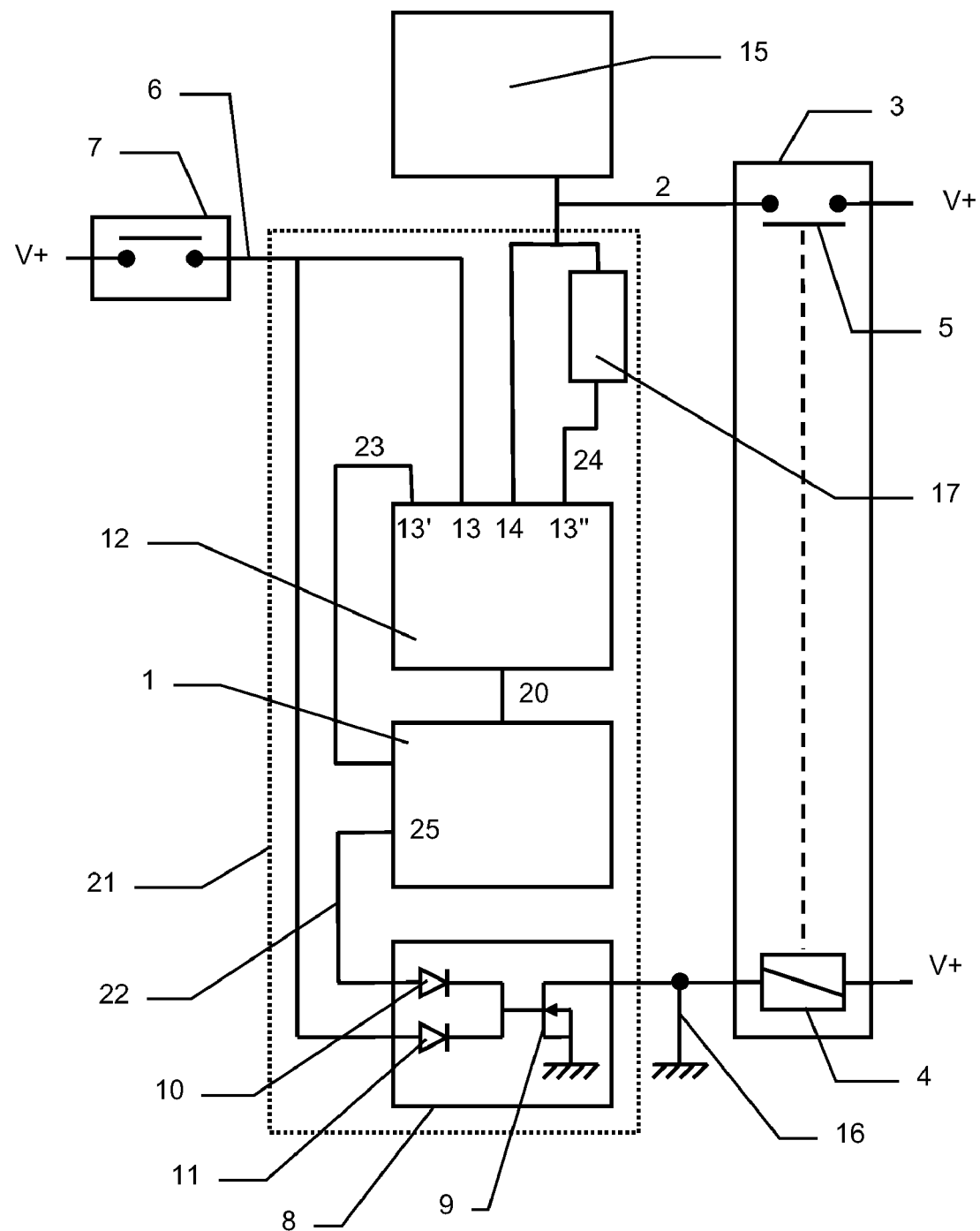
Figure 3:
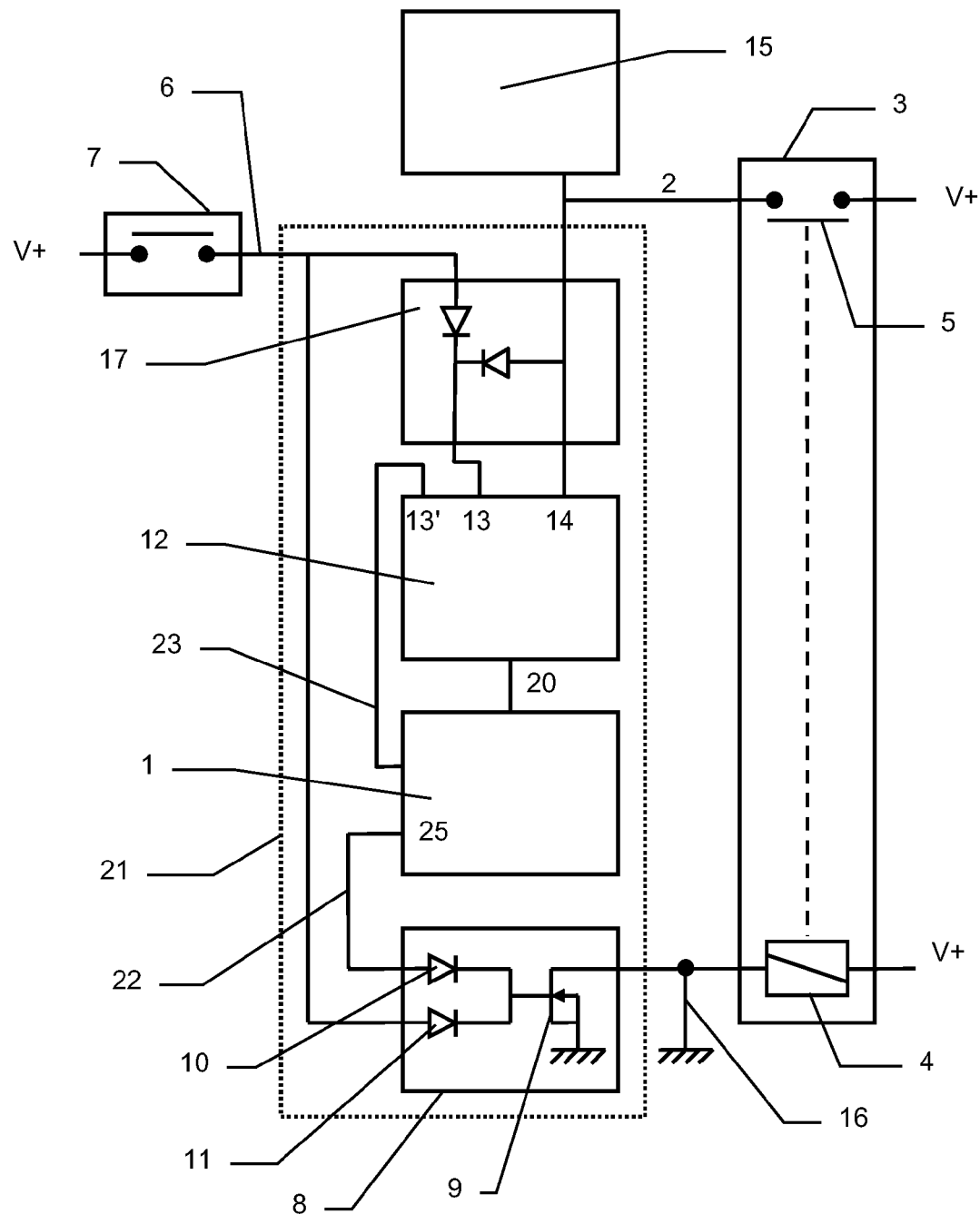
Figure 4:
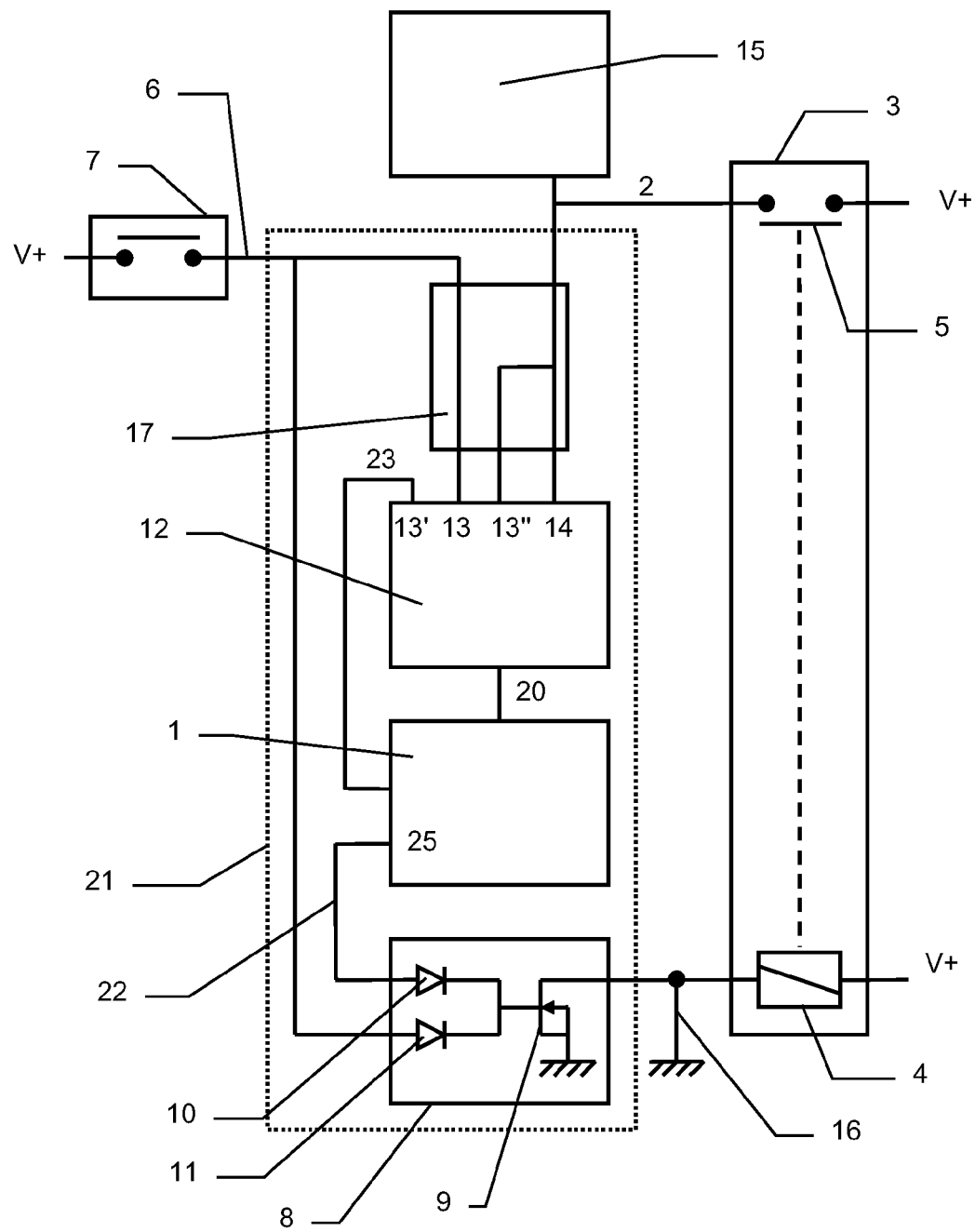

Other features, details and benefits of the invention will become more clearly apparent from the detailed description given hereinbelow by way of indication in relation to the drawings in which:

FIG. 1, already described, illustrates a device according to the prior art,

FIG. 2 comparatively illustrates an improved device according to the invention, FIG. 3 illustrates a first embodiment of an improved device according to the invention, FIG. 4 illustrates a second embodiment of an improved device according to the invention.

FIG. 2 illustrates an improved power supply device according to the invention. The device of the prior art described previously with reference to FIG. 1 has added to it a wake-up means 17 which is functionally inserted between the power relay 3 and the voltage regulator 12. The role of this wake-up means 17 is to provoke a waking-up or prevent a putting-to-sleep of the logic unit 1 when a failure 16 is present. For this, the wake-up means 17 transmits a control voltage 24 to the voltage regulator 12 (via its input 13") when the power voltage 2 is present at the output of the power relay 3. Thus, the voltage regulator 12 receives both the control voltage 24, obtained from the wake-up means 17, and the power voltage 2 (via its input 14) obtained from the power relay which remains controlled as an exact result of the failure 16. The result of this is that the voltage regulator 12, having voltages on its control input 13' and its power input 14 (even in the absence of control voltages on its inputs 13 and 13'), powers the logic unit 1. If the failure 16 occurs when the logic unit 1 is asleep/off, this leads to a power supply 20 which produces a waking-up of the logic unit 1. The logic unit 1 can then see that it is woken up whereas an observation of the state of the control member 7 indicates that it is not operated. If the failure 16 occurs when the logic unit 1 is powered, nothing happens and nothing can be detected. However, when the logic unit 1 attempts to go to sleep, it will not succeed, since, despite its stopping of the self-maintaining function, its power supply 20 continues to be maintained by the voltage regulator 12. In this case also, the observation by the logic unit 1 of the state of the control member 7 reveals that it is not operated. An absence of the control voltage 6 obtained from the control member 7 after the logic unit 1 has been woken up or after a failed attempt to put the logic unit 1 to sleep is indicative of a failure 16. The logic unit 1 can, after this diagnosis, signal the failure 16 in order to initiate a corrective intervention.

Several embodiments of such a wake-up means 17 are possible according to the interface types of the voltage regulator 12. According to a first embodiment illustrated in FIG. 3, the voltage regulator 12 has only two control inputs 13 and 13' for the control voltages 6 and 23. In this case, the input 13 must receive the control voltage 6 when the control member 7 transmits it or when the power relay 3 transmits the power voltage 2. The wake-up means 17 then interfaces the control voltage 6 obtained from the control member 7 and the power voltage 2 obtained from the power relay 3. The wake-up means 17 transmits the control voltage 6 to the single input 13 of the voltage regulator 12 when at least one of these two voltages 6, 2 is present.

For this, the wake-up means 17 comprises a logic "OR" between the control voltage 6 obtained from the control member 7 and the power voltage 2 obtained from the power relay 3 to transmit the control voltage 6 or the voltage 2 to the voltage regulator 12 on its control input 13. In this embodiment, the power voltage 2 applied to the power input 14 potentially also becomes, via the wake-up means 17, a control voltage applied to the control input 13.

An alternative to the preceding embodiment (not represented) would consist in implementing a logic "OR" in the wake-up means 17 between the control voltage 23 obtained from the logic unit 1 and the power voltage 2 obtained from the power relay 3 to transmit the control voltage 23 or the voltage 2 to the voltage regulator 12 on its control input 13'.

According to a second embodiment of the invention, illustrated in FIG. 4, the voltage regulator 12 comprises a number of inputs 13, 13' and 13" that can accept the control voltages 2, 6 and 23. These different inputs are said to be equivalent in that the voltage regulator 12 is controlled identically by these inputs 13, 13' and 13". It powers the logic unit 1 when it receives the power voltage 2 on its power input 14 and the control voltages 2, 6, 23 on at least one of its control inputs 13, 13', 13". The voltage regulator 12 then internally performs the equivalent of a logic "OR" between the different control inputs 13, 13', 13". In this case, the wake-up means 17 can be simplified. A first input 13 is used to receive, directly and, where appropriate, without passing through the wake-up means (as in FIG. 2), the control voltage 6 obtained from the control member 7, a second input 13" receives the control voltage that the wake-up means 17 transmits when it receives the power voltage 2 from the power relay 3 and the control input 13' receives the control voltage 23 obtained from the logic unit 1.

The voltages 2, 6 can be different, the wake-up means 17 comprises, if necessary, means of transforming the power voltage 2 into the control voltage 6.

Regardless of the embodiment, the device according to the invention makes it possible to perform a detection diagnosis of a failure 16 by monitoring the state of the control voltage 6 obtained from the control member 7, on start-up or following an inability to complete a putting-to-sleep of the logic unit 1.

The invention claimed is:

1. An electrical power supply device for a logic unit, comprising:
   a control member for transmitting a control voltage,
   a power relay, transmitting a power voltage when the power relay is controlled,
   an electronic stage controlling the power relay i) when the electronic stage receives the control voltage from the control member or ii) when the receiving a control voltage from the logic unit,
   a voltage regulator transmitting a power supply voltage to the logic unit when the voltage regulator receives the power voltage from the power relay and one of the control voltages, and
   a wake-up means transmitting an additional control voltage to the voltage regulator when the power relay transmits the power voltage,
   wherein the wake-up means is such that it transmits the additional control voltage to the voltage regulator
   i) when the wake-up means receives the control voltage from the control member and
   ii) when the wake-up means receives the power voltage from the power relay, and
   wherein the wake-up means comprises a logic "OR" between the control voltage obtained from the control member and the power voltage obtained from the power relay to transmit the additional control voltage to the voltage regulator.

2. A method, for a power supply device for a logic unit comprising 1) a control member for transmitting a control voltage, 2) a power relay, transmitting a power voltage when the power relay is controlled, 3) an electronic stage controlling the power relay i) when the electronic stage receives the control voltage from the control member or ii) when the receiving a control voltage from the logic unit, 4) a voltage regulator transmitting a power supply voltage to the logic unit when the voltage regulator receives the power voltage from the power relay and one of the control voltages, and 5) a wake-up means transmitting an additional control voltage to the voltage regulator when the power relay transmits the power voltage, of detecting a failure such that the power relay transmits the power voltage independently of the reception of the control voltage, characterized in that it comprises the following steps:
   on start-up or following an inability to complete a putting-to-sleep of the logic unit, measurement by the logic unit of the state of the control voltage obtained from the control member, and
   identification of a failure in the event of absence of control voltage.

3. An electrical power supply device detecting a power supply failure for a logic unit, comprising:
   a logic unit transmitting control voltages;
   a control member transmitting a control voltage;
   a power relay transmitting a power voltage when the power relay is controlled;
   an electronic stage controlling the power relay i) when receiving the control voltage from the logic unit, and ii) when receiving the control voltage from the control member;
   a voltage regulator transmitting a power supply voltage to the logic unit when the voltage regulator receives the power voltage from the power relay and the control voltage from the control member or from the logic unit; and
   a wake-up part transmitting an additional control voltage to the voltage regulator i) when the wake-up part receives the control voltage from the control member and ii) when the wake-up part receives the power voltage from the power relay.

4. The device of claim 3, wherein the wake-up part comprises a logic "OR" between the control voltage obtained from the control member and the power voltage obtained from the power relay to transmit the control voltage to the voltage regulator.

* * * * *